United States Patent
Li et al.

(10) Patent No.: US 12,520,205 B2
(45) Date of Patent: Jan. 6, 2026

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Haitao Li, Dongguan (CN); Jiangsheng Fan, Dongguan (CN); Yi Hu, Dongguan (CN); Xinlei Yu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 323 days.

(21) Appl. No.: 18/209,763

(22) Filed: Jun. 14, 2023

(65) Prior Publication Data
US 2023/0328598 A1  Oct. 12, 2023

Related U.S. Application Data

(63) Continuation of application No. PCT/CN2020/137297, filed on Dec. 17, 2020.

(51) Int. Cl.
*H04W 36/00* (2009.01)
*H04W 84/06* (2009.01)

(52) U.S. Cl.
CPC ... *H04W 36/0061* (2013.01); *H04W 36/0072* (2013.01); *H04W 84/06* (2013.01)

(58) Field of Classification Search
CPC ......... H04W 36/0061; H04W 36/0072; H04W 84/06

USPC .......................................................... 370/331
See application file for complete search history.

(56) References Cited

U.S. PATENT DOCUMENTS

| | | | |
|---|---|---|---|
| 2021/0219228 A1* | 7/2021 | Matsuda | H04W 72/0453 |
| 2022/0046498 A1* | 2/2022 | Cheng | H04B 7/1851 |
| 2022/0070812 A1* | 3/2022 | Cheng | H04W 60/04 |
| 2022/0132383 A1* | 4/2022 | Shrestha | H04W 36/0061 |

(Continued)

FOREIGN PATENT DOCUMENTS

| | | |
|---|---|---|
| CN | 101932139 A | 12/2010 |
| CN | 111095820 A | 5/2020 |
| CN | 111328126 A | 6/2020 |

(Continued)

OTHER PUBLICATIONS

U.S. Appl. No. 63/062,766 specification, All (Year: 2020).*

(Continued)

*Primary Examiner* — Anthony Mejia
(74) *Attorney, Agent, or Firm* — Sheppard, Mullin, Richter & Hampton LLP

(57) ABSTRACT

The present disclosure provides a wireless communication method, a terminal device, and a network device. The method includes: receiving, by a terminal device, first signaling transmitted by a network device, the first signaling being used to determine whether a target cell is a Non-Terrestrial Network (NTN) cell. The network device can indicate a type of a cell via first signaling, such that the terminal device can select an appropriate random access scheme to perform random access according to the type of the cell, thereby improving the success rate of the random access.

20 Claims, 4 Drawing Sheets

(56) References Cited

U.S. PATENT DOCUMENTS

2022/0322184 A1* 10/2022 Niu .................. H04W 36/0088
2023/0397061 A1* 12/2023 Huang ............. H04W 36/0061

FOREIGN PATENT DOCUMENTS

| EP | 3751908 A1 | 12/2020 | |
|----|------------|---------|---|
| WO | 2020026734 A1 | 2/2020 | |
| WO | 2020124386 A1 | 6/2020 | |
| WO | 2020220309 A1 | 11/2020 | |
| WO | WO-2021005575 A1 * | 1/2021 | ........ H04W 74/0833 |
| WO | WO-2021027423 A1 * | 2/2021 | ............ H04W 24/10 |

OTHER PUBLICATIONS

International Search Report and Written Opinion dated Aug. 18, 2021 in International Application No. PCT/CN2020/137297. English translation attached.

ZTE et al. "R2-1814244 Discussion on Network Identities in NTN", 3GPP TSG-RAN WG2 #103bis, Oct. 12, 2018 (Oct. 12, 2018), 2.2 Identification of a non-terrestrial network.

"3rd Generation Partnership Project; Technical Specification Group Radio Access Network;Solutions for NR to support non-terrestrial networks (NTN) (Release 16)", 3GPP TR 38.821 V1.0.0, Dec. 6, 2019, Section 5.3.

Extended European Search Report dated Jan. 5, 2024 received in European Patent Application No. EP20965537.2.

ZTE Corporation et al: "Consideration on system information and cell (re)selection in NTN",3GPP Draft; R2-2006872, 3rd Generation Partnership Project (3GPP), Mobile Competence Centre; 650, Route Des Lucioles; F-06921 Sophia-Antipolis Cedex; France, vol. RAN WG2, No. Electronic; Aug. 17, 2020-Aug. 28, 2020 Aug. 7, 2020 (Aug. 7, 2020), XP051911756.

LG Electronics Inc: "Report on email discussion [107#64][NTN] Cell Selection & reselection",3GPP Draft; R2-1914070 Report of Email Discussion [107#64] [NTN] Cell Selection&Reselection, 3rd Generation Partnership Project (3GPP), Mobile Competence Centre; 650, Route Des Lucioles; F-06921 Soph, vol. RAN WG2, No. Chongqing, China; Oct. 14, 2019-Oct. 18, 2019 Oct. 18, 2019 (Oct. 18, 2019), XP051797900.

Nokia et al: "Considerations on Doppler Compensation, Uplink Timing Advance and Random Access in NTN",3GPP Draft; R1-1908250, 3rd Generation Partnership Project (3GPP), Mobile Competence Centre; 650, Route Des .Lucioles; F-06921 Sophia-Antipolis Cedex; France .vol. RAN WG1, No. Prague, Czech Republic; Aug. 26, 2019-Aug. 30, 2019 Aug. 17, 2019 (Aug. 17, 2019) XP051764864.

* cited by examiner

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2020/137297 filed on Dec. 17, 2020, the entire disclosure of which is incorporated herein by reference.

TECHNICAL FIELD

The embodiments of the present disclosure relate to communication technology, and more particularly, to a wireless communication method, a terminal device and a network device.

BACKGROUND

In the New Radio (NR) system, it is considered to use a Non-Terrestrial Network (NTN) to provide communication services to users.

After the introduction of NTN, NTN cells may also be considered in the Carrier Aggregation (CA) technique and the Dual Connectivity (DC) technique. However, due to a large distance between a satellite and the ground in the NTN, the signal transmission delay between a terminal device and the satellite will be relatively high. Therefore, the terminal device cannot use a random access scheme for the Terrestrial Networks (TN) to access an NTN cell. Accordingly, how to distinguish types of cells to be accessed to achieve proper random access is a problem to be solved.

SUMMARY

The present disclosure provides a wireless communication method, a terminal device and a network device. The network device can indicate a type of a cell via first signaling, such that the terminal device can select an appropriate random access scheme to perform random access according to the type of the cell, thereby improving the success rate of the random access.

In a first aspect, a wireless communication method is provided. The method includes: receiving, by a terminal device, first signaling transmitted by a network device, the first signaling being used to determine whether a target cell is a Non-Terrestrial Network (NTN) cell.

In a second aspect, a wireless communication method is provided. The method includes: transmitting, by a network device, first signaling to the terminal device, the first signaling being used by the terminal device to determine whether a target cell is a Non-Terrestrial Network (NTN) cell.

In a third aspect, a terminal device is provided. The terminal device is configured to perform the method according to the above first aspect or any implementation thereof.

In particular, the terminal device includes one or more functional modules configured to perform the method according to the above first aspect or any implementation thereof.

In a fourth aspect, a network device is provided. The network device is configured to perform the method according to the above second aspect or any implementation thereof.

In particular, the network device includes one or more functional modules configured to perform the method according to the above second aspect or any implementation thereof.

In a fifth aspect, a terminal device is provided. The terminal device includes a processor and a memory. The memory has a computer program stored thereon, and the processor is configured to invoke and execute the computer program stored in the memory to perform the method according to the above first aspect or any implementation thereof.

In a sixth aspect, a network device is provided. The network device includes a processor and a memory. The memory has a computer program stored thereon, and the processor is configured to invoke and execute the computer program stored in the memory to perform the method according to the above second aspect or any implementation thereof.

In a seventh aspect, a chip is provided. The chip is configured to perform the method according to any of the above first and second aspects or any implementation thereof.

In particular, the chip includes a processor configured to invoke and execute a computer program from a memory, to cause a device provided with the apparatus to perform the method according to any of the above first and second aspects or any implementation thereof.

In an eighth aspect, a computer-readable storage medium is provided. The computer-readable storage medium stores a computer program that causes a computer to perform the method according to any of the above first and second aspects or any implementation thereof.

In a ninth aspect, a computer program product is provided. The computer program product includes computer program instructions that cause a computer to perform the method according to any of the above first and second aspects or any implementation thereof.

In a tenth aspect, a computer program is provided. The computer program, when executed on a computer, causes the computer to perform the method according to any of the above first and second aspects or any implementation thereof.

With the above technical solutions, the network device can indicate whether the target cell is an NTN cell via the first signaling, such that the terminal device can select an appropriate access scheme when initiating random access, thereby improving the success rate of random access.

DESCRIPTION OF EMBODIMENTS

Figure 1:
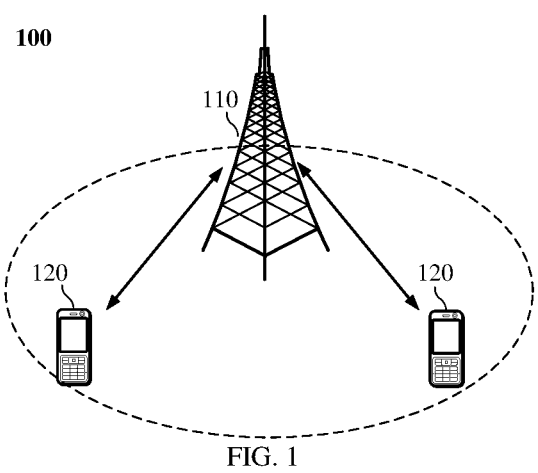
FIG. 1 is a schematic diagram showing an application scenario according to an embodiment of the present disclosure.

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the 5th Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the communication system of an embodiment of the present disclosure may be applied to unlicensed spectrum or shared spectrum. Alternatively, the communication system of an embodiment of the present disclosure may be applied to licensed spectrum or non-shared spectrum.

Optionally, the embodiments of the present disclosure may be applied to a Non-Terrestrial Network (NTN) system or a Terrestrial Network (TN) system.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home. The terminal device in the embodiments of the present disclosure may also be referred to as terminal, User Equipment (UE), access terminal device, vehicle-mounted terminal, industrial control terminal, UE unit, UE station, mobile station, mobile, remote station, remote terminal device, mobile device, UE terminal device, wireless communication device, UE agent, or UE device, etc. The terminal device can also be fixed or mobile.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, FIG. 1 is a schematic diagram showing an architecture of a communication system 100 according to an embodiment of the present disclosure. A shown in FIG. 1, the communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. Optionally, the communication system 100 may include multiple network devices, and the coverage of each network device may include other numbers of terminal devices. The embodiment of the present disclosure is not limited to this.

Figure 2:
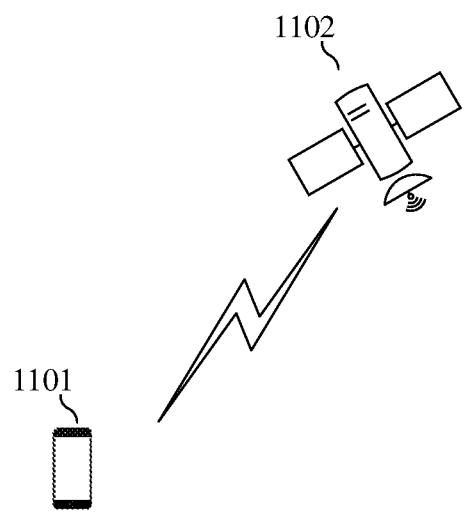
FIG. 2 is a schematic diagram showing another application scenario according to an embodiment of the present disclosure.

Exemplarily, FIG. 2 is a schematic diagram showing an architecture of another communication system according to an embodiment of the present disclosure. Referring to FIG. 2, a terminal device 1101 and a satellite 1102 are included, and wireless communication can be performed between the terminal device 1101 and the satellite 1102. The network formed between the terminal device 1101 and the satellite 1102 may also be referred to as an NTN. In the architecture of the communication system shown in FIG. 2, the satellite 1102 may function as a base station, and the terminal device 1101 and the satellite 1102 may communicate with each other directly. In this system architecture, the satellite 1102 can be referred to as a network device. Optionally, the communication system may include multiple network devices 1102, and the coverage of each network device 1102 may include a different number of terminal devices, and the embodiment of the present disclosure is not limited to this.

Figure 3:
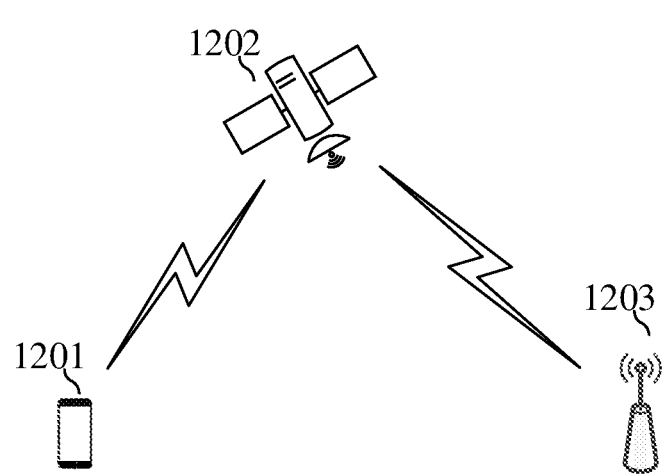
FIG. 3 is a schematic diagram showing yet another application scenario according to an embodiment of the present disclosure.

Exemplarily, FIG. 3 is a schematic diagram showing an architecture of yet another communication system according to an embodiment of the present disclosure. Referring to FIG. 3, a terminal device 1201, a satellite 1202, and a base station 1203 are included, wireless communication can be performed between the terminal device 1201 and the satellite 1202, and communication can be performed between the satellite 1202 and the base station 1203. The network formed among the terminal device 1201, the satellite 1202, and the base station 1203 may also be referred to as an NTN. In the architecture of the communication system shown in FIG. 3, the satellite 1202 may not have the function of a base station, and the communication between the terminal device 1201 and the base station 1203 needs to be relayed via the satellite 1202. In this system architecture, the base station 1203 may be referred to as a network device. Optionally, the communication system may include multiple network devices 1203, and the coverage of each network device 1203 may include a different number of terminal devices, and the embodiment of the present disclosure is not limited to this.

It should be noted that FIG. 1 to FIG. 3 are only illustrations of systems where the present disclosure can be applied. Of course, the methods shown in the embodiments of the present disclosure can also be applied to other systems, e.g., 5G communication systems, LTE communication systems, etc., and the embodiment of the present disclosure is not limited to this.

Optionally, the wireless communication system shown in FIGS. 1-3 may also include other network entities such as a Mobility Management Entity (MME) or an Access and Mobility Management Function (AMF). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In the embodiments of the present disclosure, "predefined" may implemented as pre-stored in one or more devices (for example, including a terminal device and a network device) corresponding codes, tables or other means that can be used to indicate related information, and the present disclosure is not limited to its specific implementation. For example, "predefined" may refer to defined in protocols.

In the embodiments of the present disclosure, "protocols" may refer to standard protocols in the communication field, including e.g., the LTE protocol, the NR protocol, and related protocols applied in future communication systems. The present disclosure is not limited to any of these examples.

In order to facilitate understanding of the technical solutions of the embodiments of the present disclosure, the technical solutions of the present disclosure will be described in detail below with reference to specific examples. The following related technologies as optional solutions may be arbitrarily combined with the technical solutions of the embodiments of the present disclosure, and all of these combinations are to be encompassed by the scope of the embodiments of the present disclosure. The embodiments of the present disclosure include at least part of the following content.

Satellites can be divided into two types based on the functions they provide: transparent payload and regenerative payload. For the transparent payload satellite, it only provides the functions of radio frequency filtering, frequency conversion, and amplification, and only provides transparent forwarding of signals without changing their waveforms. For the regenerative payload satellite, in addition to the functions of radio frequency filtering, frequency conversion, and amplification, it can also provide functions of demodulation/decoding, routing/switching, and coding/modulation, and has part or all of the functions of a base station.

Figure 4:
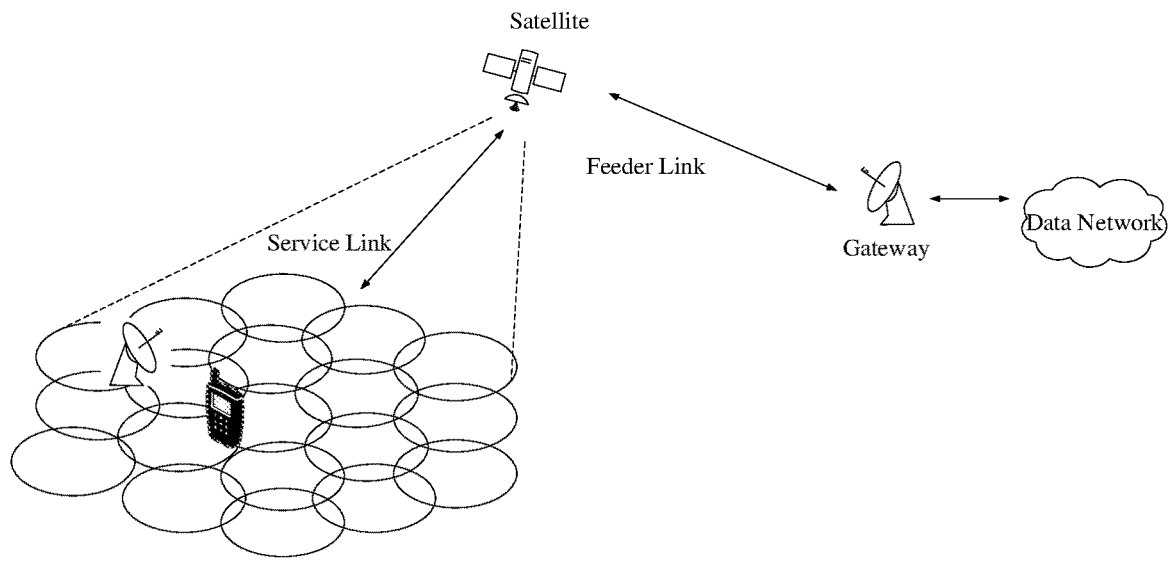
FIG. 4 is a schematic diagram showing an NTN scenario based on a transparent payload satellite.
Figure 5:
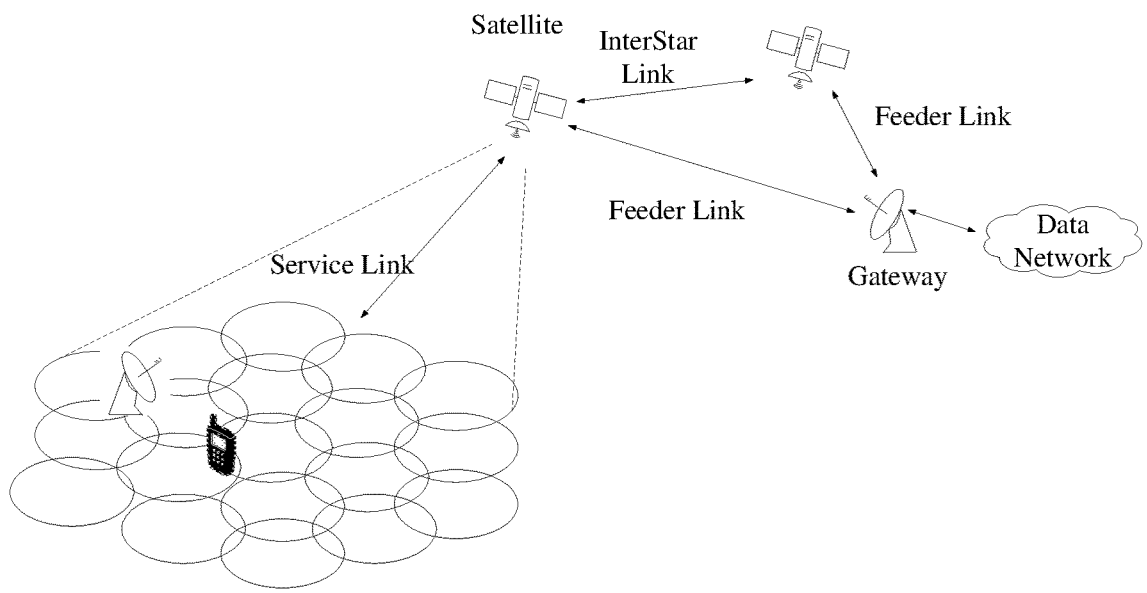
FIG. 5 is a schematic diagram showing an NTN scenario based on a regenerative payload satellite.

FIG. 4 and FIG. 5 are schematic diagrams showing NTN scenarios based on a transparent payload satellite and a regenerative payload satellite, respectively. Here, the NTN network may include one or more gateways for communication between satellites and terminals. For the NTN scenario based on the transparent payload satellite, the communication between the gateway and the satellite is provided via a feeder link, and the communication between the satellite and the terminal can be provided via a service link. For the NTN scenario based on the regenerative payload satellite, the communication between satellites is provided via an InterStar link, the communication between the gateway and the satellite is provided via a feeder link, and the communication between the satellite and the terminal can be provided via a service link.

In an uplink transmission, in order to ensure the orthogonality of the uplink transmission and avoid intra-cell interference, the network requires that signals from different UEs at the same time but with different frequency domain resources arrive at the network at substantially aligned time. In order to ensure time synchronization on the network side, an uplink Timing Advance (TA) mechanism is introduced.

The uplink clock and the downlink clock on the network side are the same, but there is an offset between the uplink clock and the downlink clock on the UE side, and different UEs have different uplink timing advances. By properly controlling the offset of each UE, the network can control the time at which uplink signals from different UEs arrive at the network. For a UE that is farther away from the network, due to a larger transmission delay, it needs to transmit uplink data earlier than a UE that is closer to the network.

In the NTN scenario, due to the large signal transmission delay between terminals and the network, the network can configure a common TA for terminal devices to facilitate initial random access by the terminals. Optionally, the common TA may be determined based on a signal transmission delay between the perigee and the base station.

In order to meet the high-speed requirements, the NR system also supports CA technique. The CA technique enables the NR system to support a larger bandwidth by jointly scheduling and using resources on multiple Component Carriers (CCs), thereby enabling a higher system peak rate. According to the continuity of the aggregated carriers in the spectrum, CA can be divided into continuous carrier aggregation and non-continuous carrier aggregation. According to whether the bands where the aggregated carriers are located are the same or not, CA can be divided into intra-band carrier aggregation and inter-band carrier aggregation.

In the early deployment of NR, it is difficult to obtain complete NR coverage, and thus the typical network coverage is wide-area LTE coverage plus island-like NR coverage. Moreover, LTE is largely deployed below 6 GHz, and there is very little spectrum below 6 GHz that can be used for 5G. Therefore, NR must study the spectrum use above 6 GHz, but at high frequency bands, the coverage is limited and signals fade quickly. In addition, in order to protect the mobile operators' investment in LTE in the early stage, an operation mode of tight interworking between LTE and NR is proposed, i.e., the DC technique.

DC can have a number of operation modes, such as EN-DC (LTE-NR Dual Connectivity), NE-DC, 5GC-EN-DC, NR DC, etc. For EN-DC, the core network connected to the access network is EPC, while in other DC modes, the core network connected to the access network is 5GC.

After introduction of NTN, CA between a TN and an NTN, CA between an NTN and an NTN, DC between a TN and an NTN, and DC between an NTN and an NTN can be considered. For different types of cells, the access schemes of terminal devices may be different. Therefore, how the terminal device can distinguish types of cells to achieve efficient random access is a problem to be solved.

Figure 6:
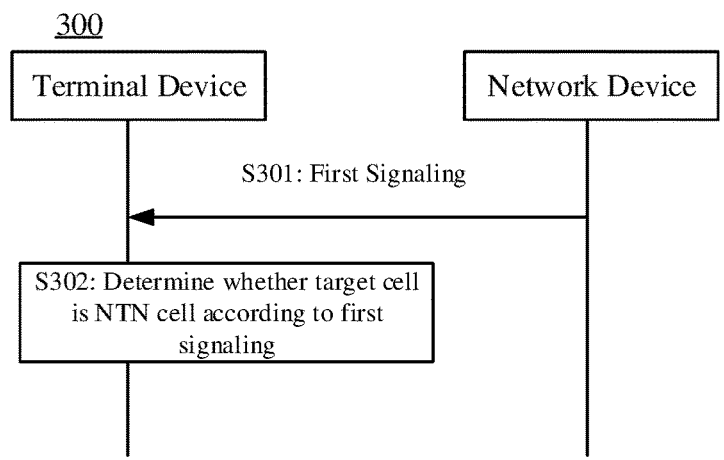
FIG. 6 is a schematic interaction diagram illustrating a wireless communication method according to an embodiment of the present disclosure.

FIG. 6 is a schematic interaction diagram illustrating a wireless communication method 300 according to another embodiment of the present disclosure. The method 300 may include at least part of the following content.

At 5301, a network device transmits first signaling to a terminal device;

Correspondingly, the terminal device receives the first signaling transmitted by the network device.

At 5302, the terminal device determines whether a target cell is an NTN cell according to the first signaling.

Optionally, in some embodiments, the first signaling may include identification information of the target cell, for example, an index of the target cell.

In some embodiments, the first signaling may be used to add a Secondary Cell (SCell) and/or a Primary Secondary Cell (PSCell), and the target cell may be the secondary cell and/or the primary secondary cell to be added. As an example, the first signaling may be a secondary cell addition request (SN Addition Request).

In some other embodiments, the first signaling may be a handover command, which is used for cell handover, and the target cell may be a target cell the terminal device is to be handed over to. Optionally, the target cell may include at least one of: Primary Cell (PCell), PSCell or S cell.

Optionally, in some embodiments, the first signaling may be Radio Resource Control (RRC) reconfiguration signaling.

Optionally, in some embodiments, the terminal device may be in a connected state.

It should be understood that, in an embodiment of the present disclosure, the target cell may include one or more cells, and the present disclosure is not limited to this. For example, the target cell may include one or more cells to be added. In another example, the target cell may include one or more cells the terminal device is to be handed over to.

It should be noted that the above specific implementation of the first signaling is only an example, and in other embodiments, the first signaling may alternatively be other signaling used to implement CA or DC technique, and the present disclosure is not limited to this.

The specific implementation of indicating the type of the target cell via the first signaling will be described below in detail.

Embodiment 1: The first signaling includes first indication information indicating whether the target cell is an NTN cell. That is, the network device may indicate whether the target cell is an NTN cell explicitly.

Optionally, the first indication information may include N bits, and the value of N may be determined based on the number of target cells. As an example, each of the N bits corresponds to one target cell, and the value of each bit indicates whether the corresponding target cell is an NTN cell. For example, a value of 1 means yes, and a value of 0 means no.

Embodiment 2: It is determined whether the target cell is an NTN cell according to whether the first signaling includes a NTN-related configuration of the target cell. That is, the network device may implicitly indicate whether the target cell is an NTN cell by indicating whether the NTN-related configuration of the target cell is included in the first signaling.

Optionally, the NTN-related configuration of the target cell may include NTN configuration information of the target cell itself, and/or an NTN configuration index of the target cell.

Optionally, the terminal device may determine whether the target cell is an NTN cell according to whether the first signaling includes the NTN configuration information of the target cell and/or the NTN configuration index of the target cell.

Optionally, in some embodiments, the NTN configuration information of the target cell may include any information for random access to the NTN cell.

As a non-limiting example, the NTN configuration information of the target cell may include at least one of:
ephemeris information of a satellite associated with the target cell;
common Timing Advance (TA) information of the target cell; or
Doppler shift information of the target cell.

Optionally, the NTN configuration index may indicate a set of NTN configuration information in an NTN configuration information list.

Optionally, the NTN configuration information list may be pre-configured, predefined, or configured by the network device via second signaling.

Optionally, in some embodiments, the second signaling may include a broadcast message.

Optionally, in some embodiments, the NTN configuration index of the target cell may be identification information of the target cell in the broadcast message. Optionally, the NTN configuration information list may include identification information of the NTN cells and NTN configuration information corresponding to the NTN cells. For example, each NTN cell may correspond to an index, which corresponds to a set of NTN configuration information.

As an example, the first signaling including the NTN configuration information of the target cell indicates that the target cell is an NTN cell.

As yet another example, the first signaling including no NTN configuration information of the target cell indicates that the target cell is not an NTN cell.

In some embodiments, the NTN configuration information of the NTN cell may be carried by the first signaling. In this case, the terminal device may determine whether the target cell is an NTN cell according to whether the first signaling includes the NTN configuration information of the target cell.

As an example, the first signaling including the NTN configuration index of the target cell indicates that the target cell is an NTN cell.

As yet another example, the first signaling including no NTN configuration index of the target cell indicates that the target cell is not an NTN cell.

In some embodiments, the NTN configuration information of the NTN cell may be carried by the second signaling. If the target cell is an NTN cell, the network device may include the NTN configuration index of the target cell in the first signaling, and the NTN configuration index of the target cell indicates the NTN configuration information of the target cell in the second signaling. In this case, the terminal device may determine whether the target cell is an NTN cell according to whether the first signaling includes the NTN configuration index of the target cell.

As an example, the first signaling including the NTN configuration information of the target cell or the NTN configuration index of the target cell indicates that the target cell is an NTN cell.

As another example, the first signaling including no NTN configuration information of the target cell and no NTN configuration index of the target cell indicates that the target cell is not an NTN cell.

In some embodiments, the NTN configuration information of the NTN cell may be carried by the first signaling and the second signaling. If the target cell is an NTN cell, the network device may include the NTN configuration index of the target cell or the NTN configuration information of the target cell in the first signaling. In this case, the terminal device may determine whether the target cell is an NTN cell according to whether the first signaling includes the NTN configuration information of the target cell or the NTN configuration index of the target cell.

Optionally, in some embodiments, the method 300 may further include:
obtaining the NTN configuration information of the target cell from the first signaling; or
obtaining the NTN configuration information of the target cell from the second signaling based on the NTN configuration index of the target cell.

For example, if the first signaling includes the NTN configuration information of the target cell, the terminal device may obtain the NTN configuration information of the target cell from the first signaling.

In another example, if the first signaling includes the NTN configuration index of the target cell, the terminal device may obtain the NTN configuration information of the target cell from the second signaling based on the NTN configuration index of the target cell.

Optionally, in some embodiments, the method 300 may further include:
determining, when the target cell is an NTN cell, a time domain compensation amount and/or a frequency domain compensation amount for initiating random access to the target cell based on NTN configuration information of the target cell; and
initiating random access to the target cell based on the time domain compensation amount and/or the frequency domain compensation amount.

For example, the terminal device may transmit a random access preamble based on the time domain compensation amount and/or the frequency domain compensation amount.

In some other embodiments, if the target cell is not an NTN cell, a normal random access procedure is performed. That is, the time domain compensation amount and/or the frequency domain compensation amount for transmitting the preamble is determined without using the NTN configuration information. In other words, a non-NTN cell does not correspond to the NTN configuration information.

In summary, the network device can explicitly or implicitly indicate whether the target cell is an NTN cell via the first signaling, such that the terminal device can select an appropriate access scheme when initiating random access, thereby improving the success rate of random access.

The method embodiments of the present disclosure have been described in detail above with reference to FIG. 6, and the apparatus embodiments of the present disclosure will be described in detail below with reference to FIG. 7 to FIG. 11. It should be understood that the apparatus embodiments and the method embodiments correspond to each other, and for similar descriptions, reference can be made to the method embodiments.

Figure 7:
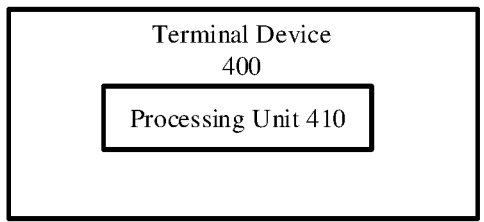
FIG. 7 is a schematic block diagram of a terminal device according to an embodiment of the present disclosure.

FIG. 7 shows a schematic block diagram of a terminal device 400 according to an embodiment of the present disclosure. As shown in FIG. 7, the terminal device 400 includes:

a communication unit 410 configured to receive first signaling transmitted by a network device, the first signaling being used to determine whether a target cell is a Non-Terrestrial Network (NTN) cell.

Optionally, in some embodiments, the first signaling may be used to add a secondary cell and/or a primary secondary cell, and the target cell is the secondary cell and/or primary secondary cell to be added.

Optionally, in some embodiments, the first signaling may be a handover command, and the target cell may be a target cell of handover.

Optionally, in some embodiments, the first signaling may include first indication information indicating whether the target cell is an NTN cell.

Optionally, in some embodiments, whether the first signaling includes NTN configuration information of the target cell and/or an NTN configuration index of the target cell may indicate whether the target cell is an NTN cell, the NTN configuration index of the target cell indicating the NTN configuration information of the target cell carried in second signaling.

Optionally, in some embodiments, the second signaling may include a broadcast message.

Optionally, in some embodiments, the first signaling including the NTN configuration information of the target cell may indicate that the target cell is an NTN cell; and the first signaling including no NTN configuration information of the target cell may indicate that the target cell is not an NTN cell.

Optionally, in some embodiments, the first signaling including the NTN configuration index of the target cell may indicate that the target cell is an NTN cell; and the first signaling including no NTN configuration index of the target cell may indicate that the target cell is not an NTN cell.

Optionally, in some embodiments, the first signaling including the NTN configuration information of the target cell or the NTN configuration index of the target cell may indicate that the target cell is an NTN cell; and the first signaling including no NTN configuration information of the target cell and no NTN configuration index of the target cell may indicate that the target cell is not an NTN cell.

Optionally, in some embodiments, the terminal device 400 may further include:

a processing unit configured to: obtain the NTN configuration information of the target cell from the first signaling; or obtain the NTN configuration information of the target cell from the second signaling based on the NTN configuration index of the target cell.

Optionally, in some embodiments, the NTN configuration information of the target cell may include at least one of:

ephemeris information of a satellite associated with the target cell;

common Timing Advance (TA) information of the target cell; or

Doppler shift information of the target cell.

Optionally, in some embodiments, the terminal device 400 may further include:

a processing unit configured to: determine, when the target cell is an NTN cell, a time domain compensation amount and/or a frequency domain compensation amount for initiating random access to the target cell based on NTN configuration information of the target cell; and initiate random access to the target cell based on the time domain compensation amount and/or the frequency domain compensation amount.

Optionally, in some embodiments, the first signaling may be Radio Resource Control (RRC) reconfiguration signaling.

Optionally, in some embodiments, the above communication unit may be a communication interface or a transceiver, or an input/output interface of a communication chip or a system-on-chip. The above processing unit may be one or more processors.

It should be understood that the terminal device 400 according to the embodiment of the present disclosure may correspond to the terminal device in the method embodiment of the present disclosure, and the above and other operations and/or functions of the respective units in the terminal device 400 are provided for the purpose of implementing the process flow corresponding to the terminal device in the method 300 shown in FIG. 6, and details thereof will be not omitted here for brevity.

Figure 8:
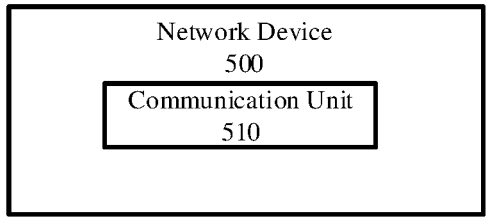
FIG. 8 is a schematic block diagram of a network device according to an embodiment of the present disclosure.

FIG. 8 shows a schematic block diagram of a network device according to an embodiment of the present disclosure. As shown in FIG. 8, the network device 500 includes:

a communication unit 510 configured to transmit first signaling to the terminal device, the first signaling being used by the terminal device to determine whether a target cell is a Non-Terrestrial Network (NTN) cell.

Optionally, in some embodiments, the first signaling may be used to add a secondary cell and/or a primary secondary cell, and the target cell may be the secondary cell and/or primary secondary cell to be added.

Optionally, in some embodiments, the first signaling may be a handover command, and the target cell may be a target cell of handover.

Optionally, in some embodiments, the first signaling may include first indication information indicating whether the target cell is an NTN cell.

Optionally, in some embodiments, whether the first signaling includes NTN configuration information of the target cell and/or an NTN configuration index of the target cell may indicate whether the target cell is an NTN cell, the NTN configuration index of the target cell indicating the NTN configuration information of the target cell carried in second signaling.

Optionally, in some embodiments, the second signaling may include a broadcast message.

Optionally, in some embodiments, the first signaling including the NTN configuration information of the target cell may indicate that the target cell is an NTN cell; and the first signaling including no NTN configuration information of the target cell may indicate that the target cell is not an NTN cell.

Optionally, in some embodiments, the first signaling including the NTN configuration index of the target cell may indicate that the target cell is an NTN cell; and the first signaling including no NTN configuration index of the target cell may indicate that the target cell is not an NTN cell.

Optionally, in some embodiments, the first signaling including the NTN configuration information of the target cell or the NTN configuration index of the target cell may indicate that the target cell is an NTN cell; and the first signaling including no NTN configuration information of the target cell and no NTN configuration index of the target cell may indicate that the target cell is not an NTN cell.

Optionally, in some embodiments, the NTN configuration information of the target cell may include at least one of:

ephemeris information of a satellite associated with the target cell;

common Timing Advance (TA) information of the target cell; or

Doppler shift information of the target cell.

Optionally, in some embodiments, the first signaling may be Radio Resource Control (RRC) reconfiguration signaling.

Optionally, in some embodiments, the above communication unit may be a communication interface or a transceiver, or an input/output interface of a communication chip or a system-on-chip. The above processing unit may be one or more processors.

It should be understood that the network device 500 according to the embodiment of the present disclosure may correspond to the network device in the method embodiment of the present disclosure, and the above and other operations and/or functions of the respective units in the network device 500 are provided for the purpose of implementing the process flow corresponding to the network device in the method 300 shown in FIG. 3, and details thereof will be not omitted here for brevity.

Figure 9:
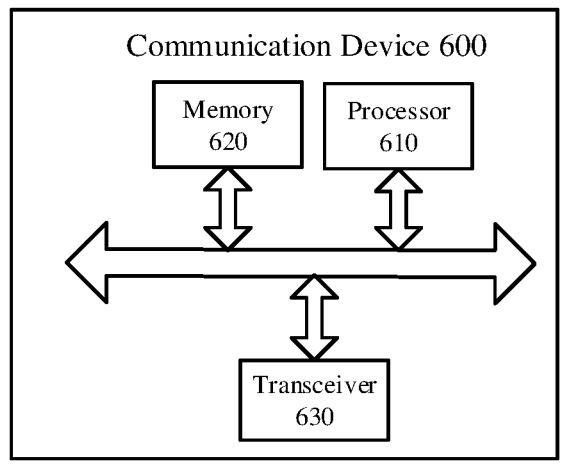
FIG. 9 is a schematic block diagram of a communication device according to an embodiment of the present disclosure.

FIG. 9 is a schematic diagram showing a structure of a communication device 600 according to an embodiment of the present disclosure. The communication device 600 shown in FIG. 9 includes a processor 610, and the processor 610 can invoke and execute a computer program from a memory to implement the method in the embodiment of the present disclosure.

Optionally, as shown in FIG. 9, the communication device 600 may further include a memory 620. The processor 610 can invoke and execute a computer program from the memory 620 to implement the method in the embodiment of the present disclosure.

The memory 620 may be a separate device independent from the processor 610, or may be integrated in the processor 610.

Optionally, as shown in FIG. 9, the communication device 600 may further include a transceiver 630, and the processor 610 may control the transceiver 630 to communicate with other devices, and in particular, transmit information or data to other devices, or receive information or data transmitted by other devices.

Here, the transceiver 630 may include a transmitter and a receiver. The transceiver 630 may further include one or more antennas.

Optionally, the communication device 600 may specifically be the network device according to the embodiment of the present disclosure, and the communication device 600 may implement the corresponding processes implemented by the network device in any of the methods according to the embodiments of the present disclosure. For the sake of brevity, details thereof will be omitted here.

Optionally, the communication device 600 may specifically be the mobile terminal/terminal device according to the embodiment of the present disclosure, and the communication device 600 may implement the corresponding processes implemented by the mobile terminal/terminal device in any of the methods according to the embodiments of the present disclosure. For the sake of brevity, details thereof will be omitted here.

Figure 10:
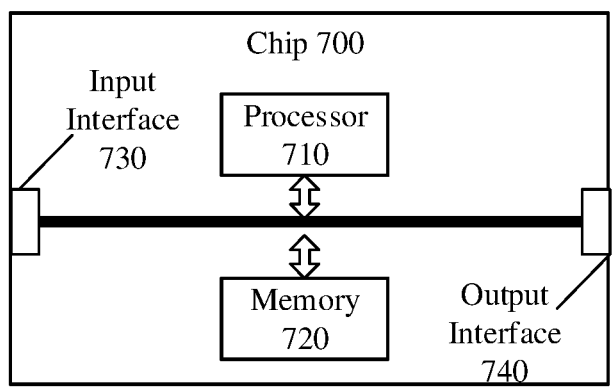
FIG. 10 is a schematic block diagram of a chip according to an embodiment of the present disclosure.

FIG. 10 is a schematic diagram showing a structure of a chip according to an embodiment of the present disclosure. The chip 700 shown in FIG. 10 includes a processor 710, and the processor 710 can invoke and execute a computer program from a memory to implement the method in the embodiment of the present disclosure.

Optionally, as shown in FIG. 10, the chip 700 may further include a memory 720. The processor 710 can invoke and execute a computer program from the memory 720 to implement the method in the embodiment of the present disclosure.

The memory 720 may be a separate device independent from the processor 710, or may be integrated in the processor 710.

Optionally, the chip 700 may further include an input interface 730. The processor 710 can control the input interface 730 to communicate with other devices or chips, and in particular, obtain information or data transmitted by other devices or chips.

Optionally, the chip 700 may further include an output interface 740. The processor 710 can control the output interface 740 to communicate with other devices or chips, and in particular, output information or data to other devices or chips.

Optionally, the chip can be applied to the network device in the embodiment of the present disclosure, and the chip can implement the corresponding processes implemented by the network device in the various methods of the embodiments of the present disclosure. For the sake of brevity, details thereof will be omitted here.

Optionally, the chip can be applied to the mobile terminal/terminal device in the embodiment of the present disclosure, and the chip can implement the corresponding processes implemented by the mobile terminal/terminal device in the various methods of the embodiments of the present disclosure. For the sake of brevity, details thereof will be omitted here.

Optionally, the chip in the embodiment of the present disclosure may be a system-level chip, a system-chip, a chip system, or a system-on-chip.

Figure 11:
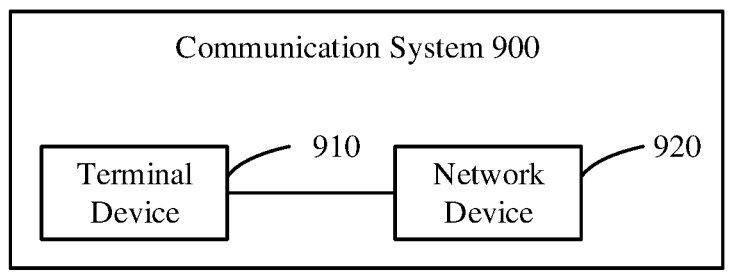
FIG. 11 is a schematic block diagram of a communication system according to an embodiment of the present disclosure.

FIG. 11 is a schematic block diagram showing a communication system 900 according to an embodiment of the present disclosure. As shown in FIG. 11, the communication system 900 includes a terminal device 910 and a network device 920.

Here, the terminal device 910 can be configured to implement the corresponding functions implemented by the terminal device in the above method, and the network device 920 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
   receiving, by a terminal device, first signaling transmitted by a network device, the first signaling being used to determine whether a target cell is a Non-Terrestrial Network (NTN) cell;
   determining, by the terminal device, that the target cell is the NTN cell in response to the first signaling including NTN configuration information of the target cell and/or an NTN configuration index of the target cell; and
   determining, by the terminal device, that a target cell is not the NTN cell in response to the first signaling not including the NTN configuration information of the target cell and/or the NTN configuration index of the target cell.

2. The method according to claim 1, wherein the first signaling is a handover command, and the target cell is a target cell of handover.

3. The method according to claim 1, wherein the first signaling comprises first indication information indicating whether the target cell is the NTN cell.

4. The method according to claim 1, wherein the NTN configuration index of the target cell indicates the NTN configuration information of the target cell carried in second signaling.

5. The method according to claim 4, further comprising:
   obtaining the NTN configuration information of the target cell from the first signaling; or
   obtaining the NTN configuration information of the target cell from the second signaling based on the NTN configuration index of the target cell.

6. The method according to claim 4, wherein the NTN configuration information of the target cell comprises at least one of:
   ephemeris information of a satellite associated with the target cell;
   common Timing Advance (TA) information of the target cell; or
   Doppler shift information of the target cell.

7. The method according to claim 1, further comprising:
   determining, when the target cell is the NTN cell, a time domain compensation amount and/or a frequency domain compensation amount for initiating random access to the target cell, based on the NTN configuration information of the target cell; and
   initiating random access to the target cell based on the time domain compensation amount and/or the frequency domain compensation amount.

8. The method according to claim 1, wherein the first signaling is Radio Resource Control (RRC) reconfiguration signaling.

9. A terminal device, comprising a processor and a memory, wherein the memory has a computer program stored thereon, and the processor is configured to invoke and execute the computer program stored in the memory to:
   receive first signaling transmitted by a network device, the first signaling being used to determine whether a target cell is a Non-Terrestrial Network (NTN) cell;
   determining, by the terminal device, that the target cell is the NTN cell in response to the first signaling including NTN configuration information of the target cell and/or an NTN configuration index of the target cell; and
   determining, by the terminal device, that a target cell is not the NTN cell in response to the first signaling not including the NTN configuration information of the target cell and/or the NTN configuration index of the target cell.

10. The terminal device according to claim 9, wherein the first signaling is a handover command, and the target cell is a target cell of handover.

11. The terminal device according to claim 9, wherein the first signaling comprises first indication information indicating whether the target cell is the NTN cell.

12. The terminal device according to claim 9, wherein the NTN configuration index of the target cell indicates the NTN configuration information of the target cell carried in second signaling.

13. The terminal device according to claim 12, wherein the processor is further configured to invoke and execute the computer program stored in the memory to:
   obtain the NTN configuration information of the target cell from the first signaling; or
   obtain the NTN configuration information of the target cell from the second signaling based on the NTN configuration index of the target cell.

14. The terminal device according to claim 12, wherein the NTN configuration information of the target cell comprises at least one of:

ephemeris information of a satellite associated with the target cell;

common Timing Advance (TA) information of the target cell; or

Doppler shift information of the target cell.

15. A network device, comprising a processor and a memory, wherein the memory has a computer program stored thereon, and the processor is configured to invoke and execute the computer program stored in the memory to:

transmit first signaling to a terminal device, the first signaling being used by the terminal device to determine whether a target cell is a Non-Terrestrial Network (NTN) cell;

determining, by the terminal device, that the target cell is the NTN cell in response to the first signaling including NTN configuration information of the target cell and/or an NTN configuration index of the target cell; and determining, by the terminal device, that a target cell is not the NTN cell in response to the first signaling not including the NTN configuration information of the target cell and/or the NTN configuration index of the target cell.

16. The network device according to claim 15, wherein the first signaling is a handover command, and the target cell is a target cell of handover.

17. The network device according to claim 15, wherein the first signaling comprises first indication information indicating whether the target cell is the NTN cell.

18. The network device according to claim 15, wherein the NTN configuration index of the target cell indicates the NTN configuration information of the target cell carried in second signaling.

19. The network device according to claim 18, wherein the NTN configuration information of the target cell comprises at least one of:

ephemeris information of a satellite associated with the target cell;

common Timing Advance (TA) information of the target cell; or

Doppler shift information of the target cell.

20. The network device according to claim 15, wherein the first signaling is Radio Resource Control (RRC) reconfiguration signaling.

* * * * *